United States Patent
Schulz (10) Patent No.: US 8,775,953 B2
(45) Date of Patent: Jul. 8, 2014

(54) COLLAGE DISPLAY OF IMAGE PROJECTS

(75) Inventor: Egan Schulz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1460 days.

(21) Appl. No.: 11/951,296

(22) Filed: Dec. 5, 2007

(65) Prior Publication Data

US 2009/0148064 A1   Jun. 11, 2009

(51) Int. Cl.
*G06F 3/048* (2013.01)
*G06K 9/36* (2006.01)
*G09G 5/00* (2006.01)

(52) U.S. Cl.
USPC ........... 715/764; 715/765; 715/769; 382/284; 345/629

(58) Field of Classification Search
USPC ............. 178/18.01; 382/284, 306; 707/104.3; 715/764, 765, 769; 345/629
See application file for complete search history.

(56) References Cited

U.S. PATENT DOCUMENTS

| | | |
|---|---|---|
| 4,343,037 A | 8/1982 | Bolton |
| 4,885,704 A | 12/1989 | Takagi et al. |
| 5,060,135 A | 10/1991 | Levine et al. |
| 5,083,860 A | 1/1992 | Miyatake et al. |
| 5,140,677 A | 8/1992 | Fleming et al. |
| 5,187,776 A | 2/1993 | Yanker |
| 5,283,557 A | 2/1994 | Memarzadeh |
| 5,287,446 A | 2/1994 | Williams et al. |
| 5,504,852 A | 4/1996 | Thompson-Rohrlich |
| 5,559,707 A | 9/1996 | DeLorme et al. |

(Continued)

FOREIGN PATENT DOCUMENTS

| | | |
|---|---|---|
| EP | 0 403 125 | 12/1990 |
| EP | 0990996 | 4/2000 |

(Continued)

OTHER PUBLICATIONS

Adobe Systems Incorporated, Windows® 2000, XP®, Adobe® Photoshop® Elements 3.0; The NPD Group/NPD Techworld, Sep. 2003 to May 2004, Publically Available Over the Internet as of Oct. 1, 2004, 16 pages.

(Continued)

*Primary Examiner* — Tadeese Hailu
(74) *Attorney, Agent, or Firm* — Schwegman Lundberg & Woessner, P.A.

(57) ABSTRACT

Techniques are described for displaying projects of images as "collages". Collages differ from conventional thumbnail displays of projects in that collages display an entire project as if the project were a single image. Consequently, collages better convey the characteristics of projects as a whole, while de-emphasizing the distinctiveness of individual images within the projects. When displayed as collages, side-by-side comparisons may be readily performed between projects as a whole. For example, a single display may include collages for multiple projects, thereby allowing viewers to quickly tell how the projects differ in a variety of ways, including but not limited to size of shoot or density of shoot, dominant color, mood, time of day, bracketed shots or bursts, location and subject matter. The content of the collage for a project is based on the individual images that belong to the project. However, details of the individual images on which the project image is based may not be readily discernible from the collage. In addition, not all individual images that belong to a project may be used in a collage. Techniques for selecting which individual images of a project to include in the project are also described.

20 Claims, 4 Drawing Sheets

(56) References Cited

U.S. PATENT DOCUMENTS

| | | | |
|---|---|---|---|
| 5,576,759 A | 11/1996 | Kawamura et al. | |
| 5,636,036 A | 6/1997 | Ashbey | |
| 5,638,523 A | 6/1997 | Mullet et al. | |
| 5,675,358 A | 10/1997 | Bullock et al. | |
| 5,752,244 A | 5/1998 | Rose et al. | |
| 5,754,348 A | 5/1998 | Soohoo | |
| 5,802,492 A | 9/1998 | DeLorme et al. | |
| 5,838,326 A | 11/1998 | Card et al. | |
| 5,893,095 A | 4/1999 | Jain et al. | |
| 5,895,464 A | 4/1999 | Bhandari et al. | |
| 6,005,679 A | 12/1999 | Haneda | |
| 6,085,112 A | 7/2000 | Kleinschmidt et al. | |
| 6,101,431 A | 8/2000 | Niwa et al. | |
| 6,111,586 A | 8/2000 | Ikeda et al. | |
| 6,130,665 A | 10/2000 | Ericsson | |
| 6,175,841 B1 | 1/2001 | Loiacono | |
| 6,178,432 B1 | 1/2001 | Cook et al. | |
| 6,184,823 B1 | 2/2001 | Smith et al. | |
| 6,243,724 B1 | 6/2001 | Mander et al. | |
| 6,253,218 B1 | 6/2001 | Aoki et al. | |
| 6,321,158 B1 | 11/2001 | DeLorme et al. | |
| 6,415,320 B1 | 7/2002 | Hess et al. | |
| 6,453,078 B2* | 9/2002 | Bubie et al. | 382/305 |
| 6,509,912 B1 | 1/2003 | Moran et al. | |
| 6,549,660 B1 | 4/2003 | Lipson et al. | |
| 6,606,411 B1 | 8/2003 | Loui et al. | |
| 6,613,101 B2 | 9/2003 | Mander et al. | |
| 6,618,498 B1 | 9/2003 | Nakayama | |
| 6,704,034 B1 | 3/2004 | Rodriguez et al. | |
| 6,731,316 B2 | 5/2004 | Herigstad et al. | |
| 6,738,154 B1 | 5/2004 | Venable | |
| 6,862,038 B1 | 3/2005 | Anderson | |
| 6,897,880 B2 | 5/2005 | Samra | |
| 6,899,539 B1 | 5/2005 | Stallman et al. | |
| 7,091,959 B1 | 8/2006 | Clary | |
| 7,096,117 B1 | 8/2006 | Gale et al. | |
| 7,099,882 B2 | 8/2006 | McDonough | |
| 7,164,423 B1 | 1/2007 | Westen | |
| 7,185,929 B2 | 3/2007 | Moyo | |
| 7,202,878 B2 | 4/2007 | Safadi et al. | |
| 7,480,872 B1 | 1/2009 | Ubillos | |
| 7,553,457 B2 | 6/2009 | Gomi | |
| 7,555,148 B1* | 6/2009 | Steinberg et al. | 382/118 |
| 7,557,818 B1 | 7/2009 | Ubillos et al. | |
| 7,573,486 B2* | 8/2009 | Mondry et al. | 345/619 |
| 7,577,922 B2 | 8/2009 | Mann et al. | |
| 7,580,952 B2* | 8/2009 | Logan et al. | 1/1 |
| 7,644,373 B2* | 1/2010 | Jing et al. | 715/838 |
| 7,656,543 B2* | 2/2010 | Atkins | 358/1.13 |
| 7,668,400 B2* | 2/2010 | Widdowson et al. | 382/276 |
| 7,705,858 B2 | 4/2010 | Ubillos et al. | |
| 7,719,548 B2 | 5/2010 | Ubillos et al. | |
| 7,746,360 B2 | 6/2010 | Ubillos et al. | |
| 7,765,165 B2 | 7/2010 | Malden et al. | |
| 7,804,508 B2 | 9/2010 | Ubillos et al. | |
| 7,961,938 B1* | 6/2011 | Remedios | 382/162 |
| 2001/0004268 A1 | 6/2001 | Kubo et al. | |
| 2001/0014184 A1* | 8/2001 | Bubie et al. | 382/293 |
| 2001/0022564 A1 | 9/2001 | Youngquist et al. | |
| 2001/0040551 A1 | 11/2001 | Yates et al. | |
| 2001/0056434 A1 | 12/2001 | Kaplan et al. | |
| 2002/0008721 A1 | 1/2002 | Fahraeus et al. | |
| 2002/0010589 A1 | 1/2002 | Nashida et al. | |
| 2002/0054172 A1 | 5/2002 | Berman et al. | |
| 2002/0070982 A1 | 6/2002 | Hill et al. | |
| 2002/0158973 A1 | 10/2002 | Gomi | |
| 2002/0180803 A1 | 12/2002 | Kaplan et al. | |
| 2002/0191867 A1 | 12/2002 | Le et al. | |
| 2003/0038787 A1 | 2/2003 | Nishiyama | |
| 2003/0084065 A1 | 5/2003 | Lin et al. | |
| 2003/0093445 A1 | 5/2003 | Schick et al. | |
| 2003/0095697 A1 | 5/2003 | Wood et al. | |
| 2003/0095720 A1* | 5/2003 | Chiu et al. | 382/284 |
| 2003/0123713 A1 | 7/2003 | Geng | |
| 2003/0156138 A1* | 8/2003 | Vronay et al. | 345/772 |
| 2003/0179154 A1 | 9/2003 | Demsky et al. | |
| 2003/0179953 A1* | 9/2003 | Ishizaka | 382/298 |
| 2003/0189602 A1 | 10/2003 | Dalton et al. | |
| 2003/0190090 A1 | 10/2003 | Beeman et al. | |
| 2003/0193525 A1 | 10/2003 | Nygaard, Jr. | |
| 2003/0223650 A1 | 12/2003 | Kim | |
| 2003/0227468 A1 | 12/2003 | Takeda | |
| 2004/0024758 A1 | 2/2004 | Iwasaki | |
| 2004/0056869 A1 | 3/2004 | Jetha et al. | |
| 2004/0095376 A1* | 5/2004 | Graham et al. | 345/716 |
| 2004/0111332 A1 | 6/2004 | Baar et al. | |
| 2004/0125425 A1 | 7/2004 | Johnson | |
| 2004/0133927 A1 | 7/2004 | Sternberg et al. | |
| 2004/0139400 A1 | 7/2004 | Allam et al. | |
| 2004/0160462 A1* | 8/2004 | Sheasby et al. | 345/788 |
| 2004/0187078 A1* | 9/2004 | Girgensohn | 715/517 |
| 2004/0189827 A1 | 9/2004 | Kim et al. | |
| 2004/0205498 A1* | 10/2004 | Miller | 715/501.1 |
| 2004/0228504 A1 | 11/2004 | Chang | |
| 2004/0240709 A1 | 12/2004 | Shoemaker | |
| 2004/0247174 A1 | 12/2004 | Lyons et al. | |
| 2005/0007382 A1 | 1/2005 | Schowtka | |
| 2005/0010475 A1 | 1/2005 | Perkowski et al. | |
| 2005/0044485 A1* | 2/2005 | Mondry et al. | 715/502 |
| 2005/0097071 A1 | 5/2005 | VanGilder | |
| 2005/0134610 A1 | 6/2005 | Doyle et al. | |
| 2005/0163378 A1 | 7/2005 | Chen | |
| 2005/0177783 A1 | 8/2005 | Agrawala et al. | |
| 2005/0177801 A1* | 8/2005 | Vronay et al. | 715/828 |
| 2005/0179705 A1 | 8/2005 | Ubillos et al. | |
| 2005/0192924 A1 | 9/2005 | Drucker et al. | |
| 2005/0197763 A1 | 9/2005 | Robbins et al. | |
| 2005/0206734 A1 | 9/2005 | Kubo et al. | |
| 2005/0262447 A1 | 11/2005 | Shoemaker | |
| 2006/0041613 A1 | 2/2006 | Fackelmayer et al. | |
| 2006/0071942 A1 | 4/2006 | Ubillos et al. | |
| 2006/0071947 A1 | 4/2006 | Ubillos et al. | |
| 2006/0117067 A1 | 6/2006 | Wright et al. | |
| 2006/0119619 A1 | 6/2006 | Fagans et al. | |
| 2006/0150092 A1* | 7/2006 | Atkins | 715/517 |
| 2006/0150215 A1* | 7/2006 | Wroblewski | 725/47 |
| 2006/0181736 A1* | 8/2006 | Quek et al. | 358/1.18 |
| 2006/0220986 A1 | 10/2006 | Takabe et al. | |
| 2006/0248063 A1* | 11/2006 | Gordon | 707/3 |
| 2006/0256134 A1* | 11/2006 | Widdowson | 345/629 |
| 2006/0259863 A1 | 11/2006 | Obrador et al. | |
| 2007/0035551 A1 | 2/2007 | Ubillos | |
| 2007/0041030 A1 | 2/2007 | Kojima | |
| 2007/0074110 A1* | 3/2007 | Miksovsky et al. | 715/520 |
| 2007/0208858 A1 | 9/2007 | Ra et al. | |
| 2007/0216782 A1 | 9/2007 | Chernoff | |
| 2008/0089580 A1 | 4/2008 | Marco | |
| 2008/0193048 A1* | 8/2008 | Sun et al. | 382/284 |
| 2008/0205789 A1* | 8/2008 | Ten Kate et al. | 382/284 |
| 2008/0292162 A1* | 11/2008 | Gering et al. | 382/131 |
| 2009/0187858 A1 | 7/2009 | Ubillos et al. | |
| 2010/0041442 A1 | 2/2010 | Hong | |
| 2010/0079495 A1 | 4/2010 | Ubillos et al. | |
| 2010/0107101 A1 | 4/2010 | Shaw | |
| 2010/0146447 A1 | 6/2010 | Ubillos et al. | |
| 2010/0150656 A1 | 6/2010 | Feldman et al. | |
| 2010/0180234 A1* | 7/2010 | Szuszczewicz | 715/838 |
| 2010/0192095 A1 | 7/2010 | Ubillos et al. | |
| 2010/0195055 A1 | 8/2010 | Maekawa | |
| 2010/0245345 A1 | 9/2010 | Tomisawa et al. | |
| 2011/0064317 A1 | 3/2011 | Ubillos | |
| 2011/0128555 A1 | 6/2011 | Rotchild et al. | |

FOREIGN PATENT DOCUMENTS

| | | |
|---|---|---|
| EP | 1 369 792 A2 | 12/2003 |
| GB | 2310988 A | 9/1997 |
| JP | 01064062 | 9/1989 |

(56) References Cited

FOREIGN PATENT DOCUMENTS

| | | |
|---|---|---|
| JP | 2003-303211 | 10/2003 |
| WO | WO 93/22738 | 11/1993 |

OTHER PUBLICATIONS

Baudisch, P. et al., "Focus plus context screens: displays for user working with large visual documents," CHI'02: CHI'02 extended abstracts on Human factors in computing systems, 2001 (2 pages).

Baudisch, P. et al., "Keeping Things in Context: A Comparative Evaluation of Focus Plus Context Screens, Overviews, and Zooming," Information Sciences and Technologies LabComputer Science Lab Xerox, Palo Alto Research Center, April.

Blacksun Software downloaded from the Interenet on Apr. 21, 2010 < http://web.archive.org/web/20041206015301/www.blacsunsoftware.com/lensview.html > 1994-2004 (1 page).

Branscombe, M., "Getting to know XP Multimedia," PC Answer, XP-002330622, dated May 2002, 3 pages.

European Patent Office, "Communication Pursuant to Article 94(3) EPC," Application No. 05805830.6-1245, dated May 28, 2008, 8 pages.

Claims, Application No. 05805830.6-1245, 3 pages.

European Patent Office, "Communication Pursuant to Article 94(3) EPC," application No. 05805830.6-1245, dated Dec. 2, 2009 (5 pages).

European Patent Office, "Communication Pursuant to Article 94(3) EPC," Application No. PCT/US2005/035938 dated May 20, 2008, 8 pages.

Claims, Application No. PCT/US2005/035938, 4 pages.

European Patent Office, "Communication Pursuant to Article 96(2), EPC," Application No. 05806181.3-1225 dated Oct. 29, 2007 (8 pages).

Claims, Application No. PCT/US2005/035943, 5 pages.

European Patent Office, "Communication pursuant to Article 94(3) EPC," Application No. 05806181.3-1225, dated Apr. 18, 2008, 8 pages.

European Claims, Application No. 05806181.3-1225, dated Oct. 4, 2005 (5 pages).

European Patent Office, European Search Report, App. No. 05256232.9, received Feb. 20, 2006 (9 pages).

European Current Claims of Application No. 05256232.9 dated Feb. 2006 (3 pages).

European Search Report received in Application No. 10183762.3 dated Dec. 13, 2010 (7 pages).

European Current Claims of Application No. 10183762.3 dated Dec. 2010 (4 pages).

Graham, A. et al., "Time as essence for photo browsing through personal digital libraries" Proceedings of the 2nd ACMIEEE-CS joint conference on Digital libraries, JCDL '02—Jul. 2002, 10 pages.

Gutwin, C. et al., "Interacting with Big Interfaces on Small Screens: A Comparison of Fisheye, Zoom, and Panning Techniques," Proceedings of the 27th Annual Conference on Computer Graphics and Interactive Techniques, ISBN 1-58113-208-5, pp. 145-152.

Hoeschen, C. and Dahl, C., "Photoshop Elements 2 for Windows and Macintosh: Visual Quickstart Guide," Peachpit Press, Sections from Chapters 1 and 3, Sep. 19, 2002 (3 pages).

International Business Machines Corporation, "Automated/customized method for window tilling," Research Disclosure Database No. 444135, published Apr. 2001, 3 pages.

International Searching Authority, "Patent Cooperation Treaty and Written Opinion of the International Searching Authority," PCT/US2005/035943, dated Apr. 19, 2007, 9 pages.

International Searching Authority, "Notification of Transmittal of the International Search Report and the Written Opinion of the International Searching Authority, or the Declaration," PCT/US02/03593, dated Feb. 20, 2006, 15 pages.

PCT Current Claims, PCT/US02/03593, 6 pages.

Janssen, W. C. et al., "UpLib: A universal personal digital library system," Nov. 2003, ACM, 9 pages.

Japanese Office Action received in Application No. 2005-294186 dated Mar. 29, 2011 (2 pages).

Japanese Current Claims of Application No. 2005-294186 dated Mar. 2011 (5 pages).

Japanese Office Action received in Application No. 2005-294186 dated Nov. 30, 2010 (3 pages).

Japanese Current Claims of Application No. 2005-294186 dated Jan. 2011 (3 pages).

Lee, A. et al., "Displaced Subdivision Surfaces," Proceedings of the 27th Annual Conference on Computer Graphics and Interactive Techniques, ISBN 1-58113-208-5, pp. 85-94.

Looser, J. et al., "Through the Looking Glass: The Use of Lenses as an Interface Tool for Augmented Reality Interfaces," Copyright 2004 by the Association for Computing Machinery, Inc., 2004 ACM 1-58113-883-0, pp. 204-211.

Mander, R. et al., "A 'Pile' Metaphor for Supporting Casual Organization of Information," XP 000426843, Human Interface Group, Advanced Technology, Apple Computer, Inc., publication date May 3, 1992, pp. 627-634.

Mills, M. et al., "A magnifier tool for video data", 1992 Proceedings of the SIGCHI conference on Human factors in computing systems CHI '92 Publisher: ACM Press. (6 pages).

PC Answers, XP-002330622 dated Feb. 2005 (3 pages).

Perlin, K. et al., "An Alternative Approach to the Computer Interface" (1993) (11 pages).

Rodden, K. et al., "How do people manage their digital photographs?", Proceedings of the ISGCHI conference on Human factors in computing systems CHI'03. Apr. 2003 (8 pages).

Rose, D. et al., "Content Awareness in a File System Interface Implementing the 'Pile' Metaphor for Organization Information," Proceedings of the Annual International ACM SIGIR Conference on Research and Development in Informational Retrieval, Pittsburgh, Jun. 27, 1993, XP-000463836, p. 260-269.

Rusinkiewicz, S. et al., "QSplat: A Multiresolution Point Rendering System for Large Meshes," Proceedings of the 27th Annual Conference on Computer Graphics and Interactive Techniques, Jul. 2000, pp. 343-352.

Savil, J., "How can I activate the Filmstrip view for my Windows XP folder?", windowsitpro.com, A web exclusive from FAG for Windows, Jun. 2002, 3 pages.

Sen, P., "Silhouette Maps for Improved Texture Magnification," Proceedings of the ACM Siggraph/Europgrahics Conference on Graphics Hardware, Aug. 2004, pp. 65-73, 147.

Shneiderman, B. et al., "A photo history of SIGCHI: evolution of design from personal to public, interactions," vol. 9 Issue 3, May 2002, ACM (1 page).

State Intellectual Property Office of the People's Republic of China, "The Second Office Action," application No. 200580034173.4, dated Nov. 28, 2008 (8 pages).

Claims, application No. 200580034173.4 (3 pages).

State Intellectual Property Office of the People's Republic of China, "The First Office Action," application No. 200580034288.3, dated Sep. 12, 2008, 23 pages.

Clean Claims, application No. 200580034288.3 (14 pages).

"Summons to attend oral proceeding pursuant to Rule 115(1) EPC" received in Application Serial No. 05256232.9-1225/1645950 dated Jun. 16, 2009 (8 pages).

The Patent Office of the People's Republic of China, Chinese Office Action received in Application No. 200910129558.9, Applicant: Apple Inc., dated Jan. 20, 2011 (8 pages).

Text of the Second Office Action received in Application Serial No. 200580034288.3 dated May 15, 2009 (2 pages).

Ware, C. et al., "TheDragMag image magnifier" May 1995 CHI'95; Conference companion on Human factors in computing systems. Publisher: ACM. (2 pages).

* cited by examiner

COLLAGE DISPLAY OF IMAGE PROJECTS

FIELD OF THE INVENTION

The present invention relates to digital images and, more specifically, to techniques for displaying projects of digital images.

BACKGROUND

A project is a set of digital images that are related in some manner. A project may include, for example, all photos taken on a particular day, on a particular location, or at a particular event. A project may also be all photos downloaded at the same time from a particular device, such as a digital camera. The project(s) to which a digital image belongs is typically determined based on metadata associated with the image. Such metadata may explicitly establish an image-to-project mapping (e.g. photo X belongs to project Y), or may be used as a factor to indirectly determine the project for the image. For example, the day/time that a photo was taken may be stored as metadata, and an image management application may automatically establish all photos taken on a particular day as a project.

It is often desirable to compare digital images with other digital images. For example, when selecting which digital images from a photo shoot to include in a magazine, or brochure, it is important to be able to look at the candidate photos together, to decide between them. Consequently, most image management applications include a feature that allows digital images to be concurrently displayed to facilitate side-by-side comparisons between photos.

While comparing individual photos to individual photos is relatively easy, comparing entire projects to other entire projects is not so straightforward. For example, many image management applications allow users to view thumbnails of the images that belong to a project. However, even in views where the images of a project are displayed as thumbnails, the emphasis of the display is clearly to facilitate consideration of individual photos, not the project as a whole. For example, the size of the thumbnails is typically chosen so that the user can clearly discern the content of the individual images. Consequently, for projects that have large numbers of photos, only a small subset of the photos will fit on the screen at any given time. To see all the photos in the project, the user has to scroll or page through many screens. To compare two large projects, the user has to first browse through several pages of thumbnails of the photos for one project, and then browse through several pages of thumbnails of photos for the other project.

Further, such thumbnail views typically display information about the individual photos adjacent to the thumbnails. The individual-photo metadata displayed adjacent to the thumbnails typically includes the name of the image, and may also include information such as the date the photo was taken, the resolution of the photo, the photographer, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for displaying projects of images as "collages". Collages differ from conventional thumbnail displays of projects in that collages display an entire project as if the project were a single image. Consequently, collages better convey the characteristics of projects as a whole, while de-emphasizing the distinctiveness of individual images within the projects.

The collage for a project is based on the individual images that belong to the project. However, details of the individual images on which the project image is based may not be readily discernible from the collage. In addition, in some situations, not all individual images that belong to a project may be used in the collage of the project. Techniques for selecting which individual images of a project to include in the collage of the project shall be described in detail hereafter.

When displayed as collages, side-by-side comparisons may be readily performed between projects as a whole. For example, a single display may include collages for multiple projects, thereby allowing viewers to quickly tell how the projects differ in a variety of ways, including but not limited to size of shoot or density of shoot, dominant color, mood, time of day, bracketed shots or bursts, location and subject matter. Collages make it easier for users to quickly find projects for which they are searching, and to quickly find specific individual photos within those projects, as shall be described in greater detail hereafter.

Collage Image Quantities

The individual images that are reflected in a collage are referred to herein as collage components. The "image quantity" of a dimension of a collage refers to how many collage components are included in the collage relative to the dimension. For example, a rectangular collage made up of 20 rows of 30 images has a height image quantity of 20, and a width image quantity of 30. The total image quantity of such a collage is 600.

Most digital images are rectangular. Therefore, to allow users to make project-to-project comparisons as easily as image-to-image comparisons, rectangular collages are generated, in one embodiment of the invention. One technique for generating a rectangular collage involves generating a W×H array of thumbnails, where W is the width image quantity and H is the height image quantity. When square collages are desired, W=H. In one embodiment, the actual values of W and H vary based on the number of images in the project for which the collage is being generated. Thus, the larger the number of images in the project, the larger the values for W and H.

For example, assume that one project includes 25 images, and another project includes 100 images. Further assume that square collages are desired. Under these circumstances, the 25 image project may be represented as a 5×5 collage, and the 100 image project may be represented as a 10×10 collage. Thus, both collages will have the same peripheral shape (squares), but the 10×10 collage will be composed of significantly more images.

While it is preferable for the collages of all projects to have the same peripheral shape, that shape need not be a square. For example, in one embodiment, the peripheral shape of collages may be rectangles in which the W=2H. In such an embodiment, an 18 image project may be represented by a 6×3 collage, and a 98 image project may be represented by a 14×7 collage.

In some embodiments, the peripheral shapes of collages may result in "missing components". For example, when the peripheral shape of the collages is a square, some projects may not have a perfect square number of images. Under these conditions, the last row of the collage may be incomplete. For example, if a project with 24 images is shown as a square collage, the collage may include four rows of 5 images, and one row of four images. The bottom-right corner of the collage (where the twenty-fifth image would have been displayed) may simply be empty.

An image management application may provide user interface controls that allow users to select the peripheral shape of collages. For example, the user interface controls may provide options for displaying square collages, rectangular collages where height is greater than width, and rectangular collages where width is greater than height. Other collage shapes, such as circular or X-shaped collages, are also possible. The image management application determines the image quantity for each dimensions of each collage in a manner that ensures that the resulting in collage has the selected peripheral shape.

Collage Pixel Resolutions

The image quantities of the dimensions of a collage dictate how many collage components are in the collage, but do not necessarily determine the actual display size (pixel resolution) of the collage. The pixel resolution of a collage is also affected by the display size of the collage components of which the collage is composed.

In one embodiment, the pixel size of collage components is the same across all collages, regardless of the image quantities of the dimensions of the collages. For example, collage components of all collages may be displayed as 32 pixel×32 pixel images. In such an embodiment, the pixel resolutions of a collage will vary based on the image quantities of the dimensions of the collage. Thus, the pixel resolution of collages for small projects may be very small, while the pixel resolution for collages for large projects may be enormous.

While it is desirable for collages to visually reflect the number of images within the project, it may be cumbersome to work with collages of vastly different pixel resolutions. Therefore, in one embodiment, rather than have the pixel resolution of collage components be uniform across all collages, the pixel resolution of the collage components is inversely proportional to the image quantities of the dimensions of the collage. Thus, the more collage components a collage has, the smaller the dimensions of each of those collage components.

In one embodiment, the pixel resolution of the collage components of each collage is selected in a manner that results in all collages having the same pixel resolution, regardless of the image quantities of their dimensions. In such an embodiment, the relative number of images that a project has is clearly discernible by the size of the collage components of which the collage is composed. Further, the fact that all collages have the same size and shape facilitates the concurrent display of multiple collages, and makes side-by-side comparisons easier.

Figure 1:
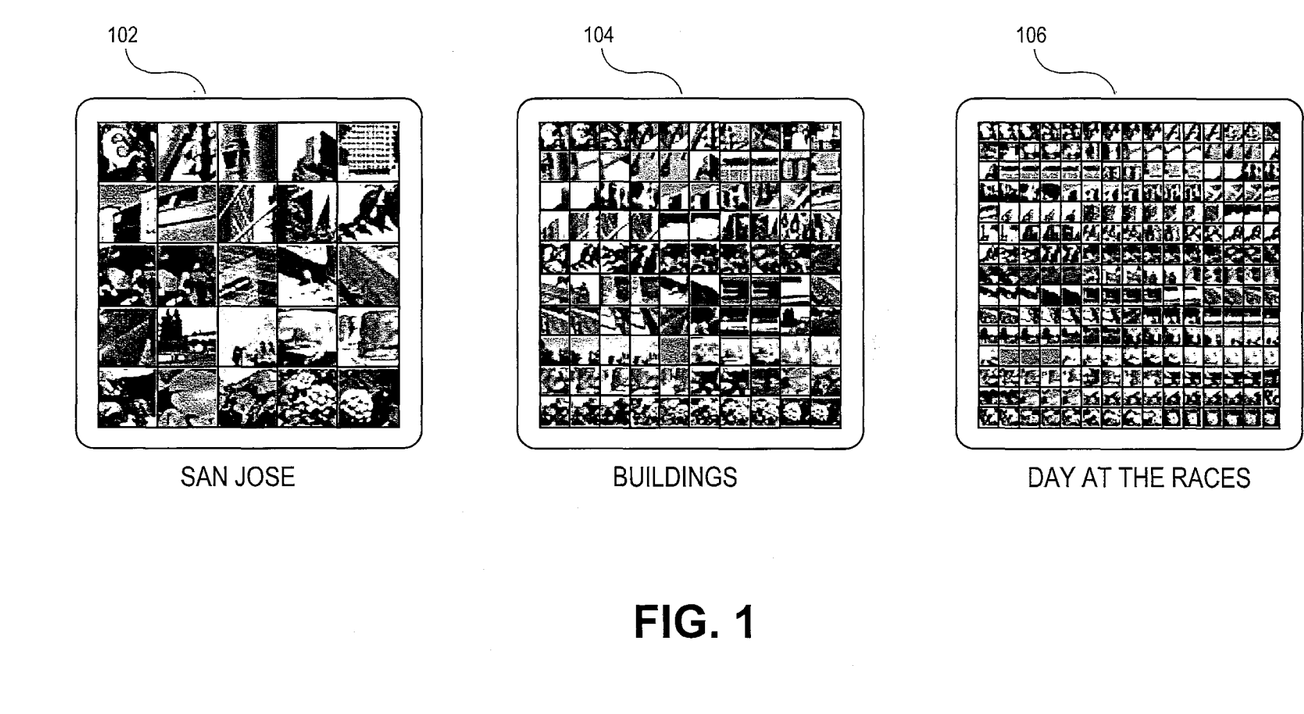
FIG. 1 is a block diagram illustrating concurrent displays of collages for projects, according to an embodiment of the invention.

FIG. 1 is a block diagram depicting three collages 102, 104 and 106 generated according to an embodiment of the invention. The image quantities of collage 102 are 5×5. The image quantities of collage 104 are 10×10. The image quantities of collage 106 are 15×15. Despite these differences in image quantities, the pixel resolution of the collages is the same for all three collages 102, 104 and 106. This pixel resolution equality is achieved by displaying relatively smaller components for collages that have more components, and relatively larger components for collages that have fewer components.

According to one embodiment, the collages of multiple projects are concurrently displayed in a manner that allows the user to easily determine which images belong to which collages. For example, in the embodiment illustrated in FIG. 1, the boundaries between images that belong to a collage are significantly smaller than the boundaries between collages. In other embodiments, the boundaries between collages may be visually distinguished in other ways. For example, the boundaries between collages may be one color, while the boundaries between images within the same collage may be another color.

A method for displaying digital images comprises the computer-executed steps of determining which images belong to each of multiple projects and concurrently displaying a collage for each project of the multiple projects. The collage for each project is composed of a plurality of images that belong to the project. Borders between images that belong to the same collage are indicated differently than borders between different collages.

Changing the Pixel Resolutions of a Collage

In one embodiment, all collages are initially displayed at the same pixel resolution, such as 160 pixels by 160 pixels, regardless of the image quantities of their dimensions. The pixel resolutions of collage components are adjusted to achieve the desired collage pixel resolution. Thus, the pixel resolutions of the components of collages with many components will be small, while the pixel resolutions of the components of collages with few components will be relatively large.

According to one embodiment, an image management application provides various features to allow users to select or change the pixel resolution of a collage. For example, in one embodiment, user interface controls are provided to allow users to select the pixel resolution of collages from a plurality of available collage pixel resolution options. The available dimensions may range, for example, from 128×128 pixels to 241×241 pixels.

In one embodiment, user interface controls are also provided for resizing collages in a manner similar to how individual images may be resized. For example, a user may click and drag on the border of a collage to grow or shrink the collage image. In response to user input received through such user controls, the image management application increases or decreases the pixel resolution of the collage components, thereby increasing or decreasing the pixel resolution of the collage itself.

The image management application may impose certain limits on how a user may resize a collage. For example, in one embodiment, (a) collage components may never be reduced to fewer than 4 pixels by 4 pixels, and (b) the border between the collage components is never less than one pixel. In such an embodiment, the total size of any collage never shrinks below 5N+1 by 5M+1, where W and H represent the dimensions of the collage in terms of components. In such an embodiment, a project with 1024 images would produce a 32×32 collage. When shown at the smallest allowed pixel resolution, such a collage would result in a 161×161 pixel square.

Collage Component Borders

According to one embodiment, collage components are separated from each other in a manner that allows individual-image boundaries to be readily perceived. Such borders may, for example, simply be a one-pixel-wide line of a particular color, such as black.

Preferably, information about the individual images of which a collage is composed is not displayed near the collage components themselves. Such information would detract from the informational content of the collage itself. As mentioned above, such informational content may include, but is not limited to: the size of a project, the density of the project, the dominant color of the project, the mood of the project, the time of day of the project, bracketed shots or bursts within the project, location of the project, and general subject matter of the project.

Selecting Collage Components

In one embodiment, all images that belong to a project are used as collage components for the collage of the project. However, such an embodiment will often result in collages that do not conform to a desired peripheral shape. For example, assume that the desired peripheral shape is a square, and that a project has 27 photos. Under these circumstances, a 6×6 collage would have nine extra image positions. If the nine extra image positions are left blank, then the collage would not look exactly square. On the other hand, a 5×5 collage would leave out two of photos. If the two extra photos are included in a sixth row, then peripheral shape will not be square.

Another disadvantage of an embodiment that uses all images of a project to create the collage for the project is that some projects may have so many images that using all images will result in collage components that are too small to be useful. For example, assuming that the collage pixel resolutions are 160×160, collages with more than 900 images (e.g. 30×30 collages) tend to be too dense to effectively convey some of the characteristics of the project. For example, a project with 1600 images yields a 40×40 image square collage which is too dense to be effectively displayed in a 160× 160 pixel region. Thus, it may be desirable to generate a collage that includes less than all of the images of the project.

To maintain a specified peripheral shape and some minimum pixel size for the collage components, embodiments are provided in which not all images that belong to a project are used in the collage of the project. In such embodiments, the image management application includes logic for selecting which images within each project to use as collage components for the collage of the project. The mechanisms for selecting which images to include in a collage may vary from implementation to implementation, and include a cropping mechanism, a formula mechanism, a cropped view with scrubbing mechanism and a cropped view with paging mechanism, each of which shall be described in greater detail hereafter.

Selection Through Cropping

Selection through cropping involves selecting the first N images in a project to be the collage components for the project, where N is highest number of images that (1) will achieve the desired peripheral collage shape, and (2) results in collage components that are not too small. For example, assume that collages are to be displayed as N×N squares, and that 30×30 is the maximum acceptable density for the collages. Assume further that a user has requested the concurrent display of collages for three projects A, B and C which have 70, 200 and 2000 images respectively. Under these conditions, the image quantities of the collage for project A would be 8×8, formed of the first 64 images in project A. The image quantities of the collage for project B would be 14×14, formed of the first 196 images in project B. Finally, the image quantities of the collage for project C would be 30×30, formed of the first 900 images in project C.

Selection through cropping has the benefit that it retains all the bracket shots and perceived "story" of a project for what is visible in the collage. However, the greater the number of images that were excluded from the collage, the smaller the percentage of the project that the collage represents. For example, for project C, the entire second half of the project is not reflected in the 30×30 collage at all.

Selection Through Formula

Selection through formula involves excluding the same number of images from the collage as cropping. However, selection through formula does not simply include the first N images, and exclude the rest. Instead, the images that are included in the collage by selection through formula are evenly spread throughout the project.

For example, assume that 25 images are to be used to make a 5×5 collage for a project that includes 30 images. Rather than select the first 25 images for inclusion, the image management application may skip every $6^{th}$ image. Thus, the collage would include images 1-5, 7-11, 13-17, 19-23 and 25-29.

For projects that have vastly more images than the maximum image quantity size will allow, the number of skipped images will be greater than the number of images that are not skipped. For example, if the maximum image quantity size for collages is 30×30, and a project includes 2700 images, every third image in the project would be selected for inclusion, and two out of every three images would be skipped.

Selection through formula is beneficial because the user always sees at least some images from the whole project. However, many of the characteristics that make collages easy to recognize, such as bracketed shots, become more and more compromised as the number of "skipped" images increases.

Cropped View with Scrubbing

Cropped view with scrubbing involves generating a collage that is larger than the maximum desired collage pixel resolutions (i.e. an "oversized collage"), and then only displaying a subset of the oversized collage at any given time. Thus, the view is cropped, but the actual collage is not. For example, assume that a project has 1600 images, but 30×30 are the maximum collage image quantities. Under these circumstances, the image management application may actually generate a 30×54 collage (with the last row only partially filled), but only show the top thirty rows of the collage. The user may then view the other portions of the 30×54 collage by operating user interface controls.

For example, user interface logic may be provided to allow the user to "scrub" (click and drag) an oversized collage. In response to user input that scrubs an oversized collage in a particular direction, the visible portion of the oversized collage will move in that direction. As a result of the movement, part of the oversized collage will cease to be displayed, and part of the oversized collage that was previously hidden will be displayed.

For example, assume that a 30×30 subset of a 30×54 oversized collage is currently displayed. Assume that a user scrubs the oversized collage up. As a result, the original 30×30 subset will move up, and the topmost row of collage components will become hidden. However, a new row of collage components will appear to the below of what was previously the lowest visible row. Thus, the user will continue to see only a 30×30 subset of the 30×54 collage, but through user input the user determines what subset of the collage is displayed.

According to one embodiment, the cropped view with scrubbing technique makes a masked window out of the portion of the screen occupied by the collage. Thus, if the pixel resolutions of collages is set to be 160×160, then the 160×160 pixel square occupied by each collage is a masked window that a user can scrub to see different portions of collages that are actually larger than 160×160.

Cropped View with Paging

Cropped view with paging is similar to cropped view with scrubbing, except that different user input is used to see the hidden portions of an oversized collage. With scrubbing, the user input "moves" the displayed portion of an oversized collage to reveal other portions of the oversized collage. In cropped view with paging, a user interface control is provided that allows a user to transition to another "page" of an oversized collage, thereby replacing the currently-displayed portion of the oversized collage with the display of another portion. In one embodiment, a single click on an oversized collage causes a different page of the collage to be displayed. In another embodiment, a small paging control may be displayed on a collage in response to the user "rolling over" the collage. The user may then click on the control to cause a different page of the oversized collage to be displayed.

User-Specified Image Quantities

According to one embodiment, an image management application provides users the ability to specify the collage image quantities of each collage. For example, slider controls may be provided for changing the image quantities of a collage without affecting the pixel resolution of the collage. When a thumb control is moved to one end of the slider control, a minimum number (e.g. two or one) of images are used to generate the collage. When the thumb control is moved to the other end of the slider control, all of the images that belong to the project are used to generate the collage for the project. Since the pixel resolution of the collage is not being changed, the pixel resolution of the collage components is reduced as the number of collage components increases.

When the thumb control is at a point between the two ends of the slider control, the image management application generates the collage based on a subset of images. The number of images used to generate the collage is based on the total number of images in the project and the position of the thumb along the slider. For example, if a project has 200 images, and the thumb control is moved to the middle of the slider control, then the collage may be generated based on 100 images.

When image quantities are specified by a user in this manner, any of the various techniques described above may be used to determine which images to include in the collage. For example, if 100 of 200 images are to be used, then the cropping technique may be used to select the first 100 images of the project. Alternatively, the selection through formula technique may be used to select 100 images by skipping every other image of the 200 images.

Combining Collages and Events

When the formula technique has been used to generate a collage based on a subset of the images in a project, there will typically be images that (1) are not in the collage, and (b) are adjacent, within the project, to an image that is in the collage. According to one embodiment, such images may be easily accessed through the collage interface by treating the image that is in the collage as a representative image of an "event".

For example, in one embodiment, as a user enters user input to skim over the representative image, the image management software visually "flips through" the images that are represented, within the collage, by the representative image. In this context, the images represented by the representative image are all images that precede or follow the representative image in the project, but that are not themselves shown in the collage.

Various techniques may be used for visually flipping through the images that are represented, within the collage, by a representative image. For example, an image in a collage may effectively represent a series of five images (e.g. where four of the five images were "skipped" in generating the collage). In one embodiment, when the user positions a pointer over the left edge of the representative image, the first of the five images image is temporarily displayed in place of the representative image. As the user moves the pointer from the left edge of the image to the right edge of the image, the image changes to the second, third, fourth, and then fifth represented image. In another embodiment, the representative image itself continues to be displayed within the collage, but another portion of the screen flips through a display of the represented images, in response to the user moving the pointer across the face of the representative image.

Using the Loupe on Collages

Digital images may be shown on a display at various levels of magnification. For example, a digital image may be shown at a reduced resolution relative to the original resolution, such that a viewer of the reduced resolution digital image cannot determine details that are apparent to a viewer of the digital image at the original resolution. To assist a viewer of the reduced resolution digital image that is rendered on a display, a software application may enable the viewer to view a magnified portion of the digital image.

Some image management applications allow users to view images at different level of magnification using a virtual loupe. One technique for implementing a virtual loupe is described in U.S. patent application Ser. No. 10/960,339, entitled "Viewing Digital Images On A Display Using A Virtual Loupe", the contents of which are incorporated herein by reference.

A virtual loupe may include one region (a "selection region") that is used for selecting what portion of an image to magnify, and another region (a "display region") for showing the selected portion at some specified level of magnification. Typically, the image management application includes logic for moving the selection region in response to user input. The display region may move along with the selection region, or may remain at a fixed position on the display screen.

According to one embodiment, a virtual loupe may be used in combination with a collage display to see the images that correspond to collage components in greater detail. For example, when the selection region of a virtual loupe is placed over a collage component of a collage, the image management application determines which image, within the project associated with the collage, corresponds to the selected collage component. The image management application further determines which portion of that image is actually selected by the loupe. The image management application then displays, within the display region of the loupe, a magnified version of the selected portion of the selected collage component.

Figure 2:
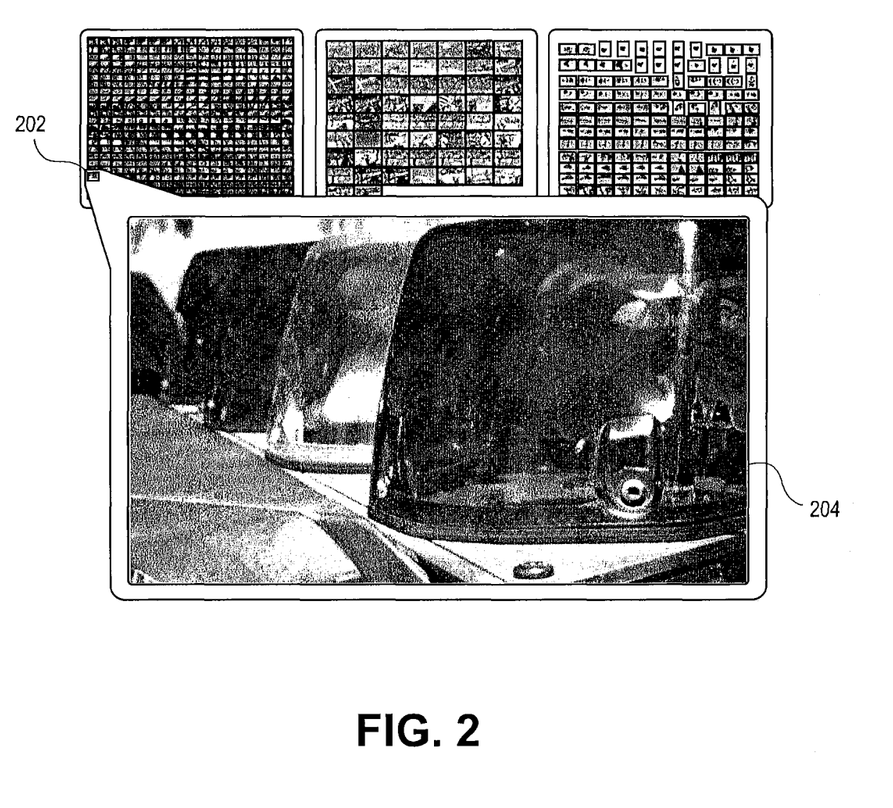
FIG. 2 is a block diagram illustrating a technique for using a virtual loupe in conjunction with collages, according to an embodiment of the invention.

In one embodiment, the selection portion of the loupe is designed to select one or more entire collage components. In such an embodiment, the display region displays magnified versions of all images selected by the selection region. For example, FIG. 2 illustrates en embodiment in which the selection region 202 is a square sized to cover a single collage component. The collage component currently selected by the selection region is displayed in greater detail in the display region 204.

Figure 3:
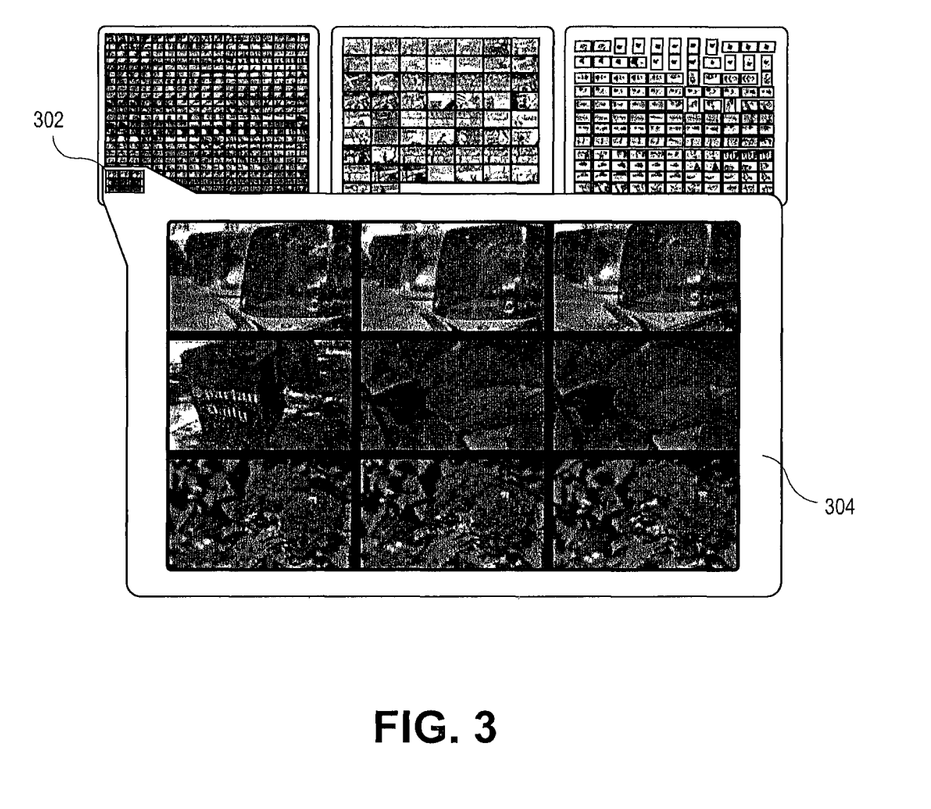
FIG. 3 is a block diagram illustrating a technique for performing a zoom operation using a virtual loupe to select multiple image components for magnification, according to an embodiment of the invention.

Referring to FIG. 3, the selection region 302 is a square sized to select a three-by-three array of collage components. The three-by-three array of collage components currently selected by the selection region is displayed in the display region 304. Preferably, the images thus selected are displayed in the same arrangement in the display region 204 as their arrangement within the collage itself.

According to one embodiment, controls are provided that allow users to "zoom" the virtual loupe when viewing components of a collage. Under these circumstances, zooming the virtual loupe has the effect of increasing or decreasing the size of the selection area. Increasing the size of the selection area causes the loupe to select more collage components. Selecting more components, in turn, causes more images to be displayed in the display region. To display more images in the display region, the size of the magnified images may have to be reduced.

Conversely, decreasing the size of the selection area causes the loupe to select fewer collage components. Selecting fewer components causes fewer images to be displayed in the display region. Because fewer images are displayed, the images can be displayed at greater levels of magnification.

According to one embodiment, double-clicking a component of a collage, whether or not the component is currently selected by a loupe, will cause the image that corresponds to the component to be opened in an image viewer and/or editor. Allowing individual images to be directly selected and opened from the collage display (which may include many collages), allows user to quickly navigate from a view that contains potentially thousands of photos, to a view that contains a single selected photo.

Hardware Overview

Figure 4:
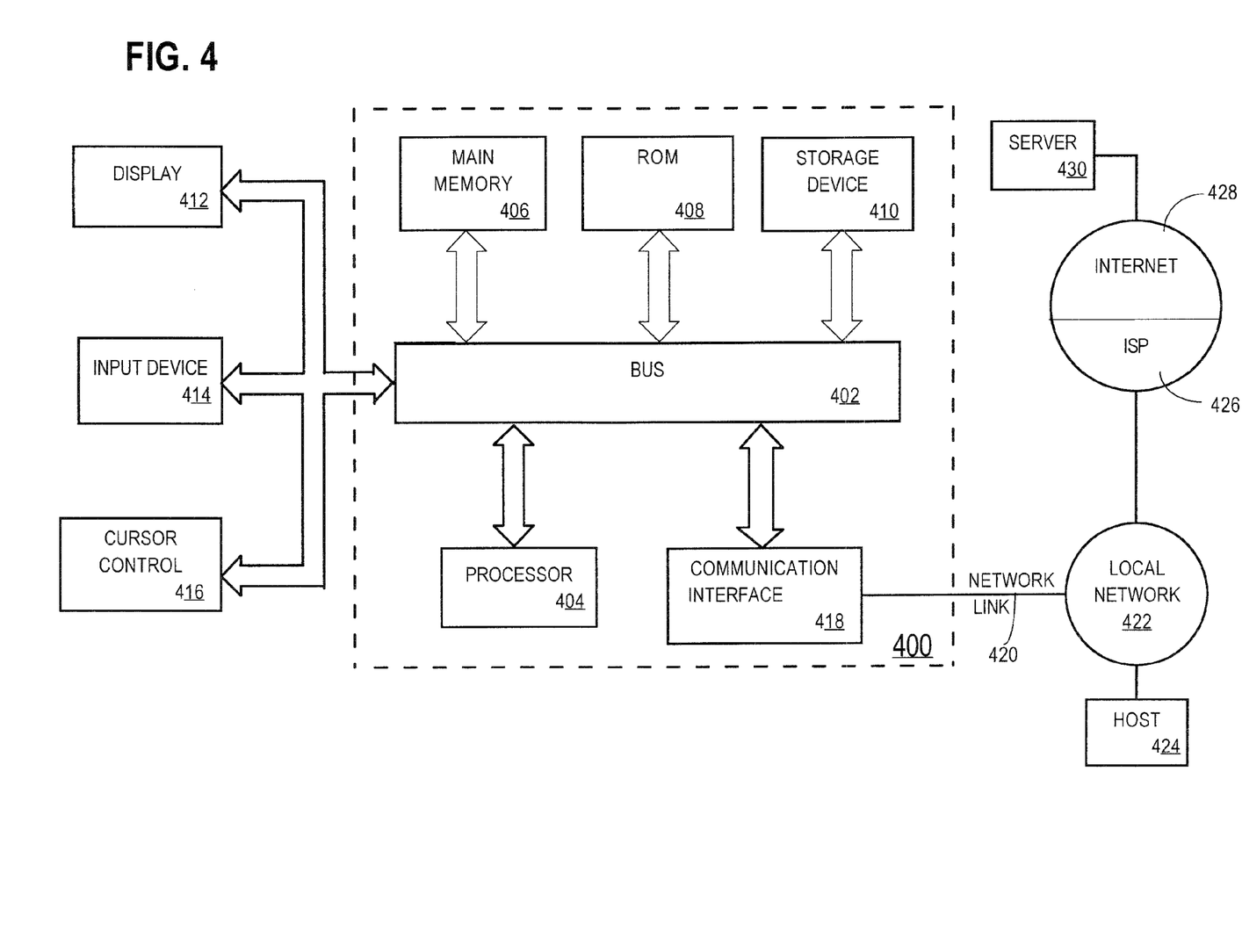
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 400, various computer-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for displaying digital images, comprising the computer-executed steps of:
   determining a first plurality of images;
   determining, based on the number of images in the first plurality of images, a pixel resolution of each image of the first plurality of images;
   causing a first collage to be displayed at a first resolution, wherein the first collage is composed of the first plurality of images;
   determining a second plurality of images;
   determining, based on the number of images in the second plurality of images, a pixel resolution of each image of the second plurality of images;
   causing a second collage to be displayed at a second resolution concurrently with the first collage, wherein the second collage is composed of a second plurality of images;
   wherein the steps of determining the pixel resolution for the first and second plurality of images are performed such that the first resolution and the second resolution are the same regardless of the number of images in the first and second plurality of images;
   wherein the number of images in the first collage is different than the number of images in the second collage;
   wherein the method is performed by one or more computing devices.

2. The method of claim 1 wherein borders between the first collage and the second collage are wider than borders between each image in the first collage and each image in the second collage.

3. The method of claim 1 further comprising selecting a subset of images to include in the first collage or the second collage.

4. The method of claim 3 wherein:
   the step of selecting is performed in response to determining that the number of images in the particular project exceeds a maximum desired number of collage components;
   the step of selecting includes selecting the first N images from a plurality of images where N is the maximum desired number of collage components.

5. The method of claim 3 wherein:
   the plurality of images have a particular order; and
   the subset of images that are selected come earlier, in the particular order, than all images that are not selected to be included in the collage.

6. The method of claim 3 wherein:
   the plurality of images have a particular order; and
   the step of selecting includes selecting images that are evenly distributed throughout the plurality of imam, relative to the particular order.

7. The method of claim 1 further comprising:
   displaying a virtual loupe that includes a selection region; and
   in response to detecting that the selection region selects a plurality of images within the first or second collage, displaying a magnified depiction of the plurality of images that are selected by the virtual loupe.

8. The method of claim 1 further comprising the steps of:
receiving user input; and
in response to the user input, moving the first or second collage in a particular direction thereby causing (a) at least some of said images in said subset of images to cease to be displayed as part of said collage, and (b) at least some of the images that are not in said subset to be displayed as part of said first or second collage.

9. One or more non-transitory computer-readable media storing instructions which, when executed by one or more processors, cause the one or more processors to:
determine a first plurality of images;
determine, based on the number of images in the first plurality of images, a pixel resolution of each image of the first plurality of images;
cause a first collage to be displayed at a first resolution, wherein the first collage is composed of the first plurality of images;
determine a second plurality of images;
determine, based on the number of images in the second plurality of images, a pixel resolution of each image of the second plurality of images;
cause a second collage for the second project to be displayed at a second resolution concurrently with the first collage, wherein the second collage is composed of a second plurality of images;
wherein the determination of the pixel resolution for the first and second plurality of images are performed such that the first resolution and the second resolution are the same regardless of the number of images in the first and second plurality of images;
wherein the number of images in the first collage is different than the number of images in the second collage.

10. The one or more non-transitory computer-readable media of claim 9, wherein the instructions include instructions which, when executed by one or more processors, further cause selecting, for a particular project of the plurality of projects, a subset of images that belong to the particular project to include in the collage for the particular project.

11. The one or more non-transitory computer-readable media of claim 10, wherein:
the step of selecting is performed in response to determining that the number of images in the particular project exceeds a maximum desired number of collage components; and
the step of selecting includes selecting the first N images from a plurality of images where N is the maximum desired number of collage components.

12. The one or more non-transitory computer-readable media of claim 10, wherein:
the plurality of images have a particular order; and
the subset of images that are selected come earlier, in the particular order, than all images that are not selected to be included in the collage.

13. The one or more non-transitory computer-readable media of claim 10, wherein:
the plurality of images have a particular order; and
the step of selecting includes selecting images that are evenly distributed throughout the plurality of images, relative to the particular order.

14. The one or more non-transitory computer-readable media of claim 9, wherein the instructions include instructions which, when executed by one or more processors, further cause:
displaying a virtual loupe that includes a selection region; and
in response to detecting that the selection region selects a plurality of images within the first or second collage, displaying a magnified depiction of the plurality of images that are selected by the virtual loupe.

15. The one or more non-transitory computer-readable media of claim 9, wherein the instructions include instructions which, when executed by one or more processors, further cause:
receiving user input; and
in response to the user input, moving the first or second collage in a particular direction thereby causing (a) at least some of said images in said subset of images to cease to be displayed as part of said collage, and (b) at least some of the images that are not in said subset to be displayed as part of said first or second collage.

16. The one or more non-transitory computer-readable media of claim 9, wherein borders between the first collage and the second collage are wider than borders between each image in the first collage and each image in the second collage.

17. An apparatus comprising:
a display;
a processor coupled to the display, the processor configured to:
determine a first plurality of images;
determine, based on the number of images in the first plurality of images, a pixel resolution of each image of the first plurality of images;
cause a first collage to be displayed on the display at a first resolution, wherein the first collage is composed of the first plurality of images;
determine a second plurality of images;
determine, based on the number of images in the second plurality of images, a pixel resolution of each image of the second plurality of images; and
cause a second collage for the second project to be displayed on the display at a second resolution concurrently with the first collage, wherein the second collage is composed of a second plurality of images;
wherein the determination of the pixel resolution for the first and second plurality of images are performed such that the first resolution and the second resolution are the same regardless of the number of images in the first and second plurality of images;
wherein the number of images in the first collage is different than the number of images in the second collage.

18. The apparatus of claim 17, wherein borders between the first collage and the second collage are wider than borders between each image in the first collage and each image in the second collage.

19. The apparatus of claim 17, wherein the processor is configured to:
display a virtual loupe that includes a selection region on the display; and
in response to detecting that the selection region selects a plurality of images within the first or second collage, displaying a magnified depiction of the plurality of images that are selected by the virtual loupe.

20. The apparatus of claim 17, further comprising:
an input device coupled to the processor;
wherein the processor is configured to receive a user input from the input device; and
in response to the user input, move the first or second collage in a particular direction on the display thereby causing (a) at least some of said images in said subset of images to cease to be displayed as part of said collage, and (b) at least some of the images, of the project, that are not in said subset displayed as part of said first or second collage.

* * * * *

UNITED STATES PATENT AND TRADEMARK OFFICE
CERTIFICATE OF CORRECTION

| | | |
|---|---|---|
| PATENT NO. | : 8,775,953 B2 | Page 1 of 1 |
| APPLICATION NO. | : 11/951296 | |
| DATED | : July 8, 2014 | |
| INVENTOR(S) | : Schulz | |

It is certified that error appears in the above-identified patent and that said Letters Patent is hereby corrected as shown below:

In the Claims

Column 12, line 59, Claim 6, delete "imam," and insert --images,--, therefor

Signed and Sealed this
Fourth Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,775,953 B2 | |
| APPLICATION NO. | : 11/951296 | |
| DATED | : July 8, 2014 | |
| INVENTOR(S) | : Schulz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1612 days.

Signed and Sealed this
Twenty-eighth Day of July, 2015

Michelle K. Lee
*Director of the United States Patent and Trademark Office*